United States Patent
Borenstein

(10) Patent No.: US 9,009,220 B2
(45) Date of Patent: Apr. 14, 2015

(54) ANALYZING STORED ELECTRONIC COMMUNICATIONS

(75) Inventor: Nathaniel S. Borenstein, Greenbush, MI (US)

(73) Assignee: Mimecast North America Inc., Watertown, MA (US)

( * ) Notice: Subject to any disclaimer, the term of this patent is extended or adjusted under 35 U.S.C. 154(b) by 529 days.

(21) Appl. No.: 13/273,696

(22) Filed: Oct. 14, 2011

(65) Prior Publication Data

US 2013/0097221 A1 Apr. 18, 2013

(51) Int. Cl.
*G06F 15/16* (2006.01)
*G06Q 10/06* (2012.01)

(52) U.S. Cl.
CPC .................. *G06Q 10/0637* (2013.01)

(58) Field of Classification Search
CPC .... G06Q 10/0637; G06F 15/16; H04L 12/24; H04L 41/00
USPC ........................................ 709/203
See application file for complete search history.

(56) References Cited

U.S. PATENT DOCUMENTS

| | | | |
|---|---|---|---|
| 7,065,433 B2 * | 6/2006 | Basu et al. ................ | 701/31.9 |
| 7,349,862 B2 | 3/2008 | Palmer et al. | |
| 7,383,252 B2 | 6/2008 | Soogoor | |
| 7,870,279 B2 * | 1/2011 | Chuang et al. ............. | 709/231 |
| 8,656,056 B2 * | 2/2014 | Bennett et al. ............. | 709/246 |
| 8,694,533 B2 * | 4/2014 | Oztaskent et al. .......... | 707/769 |
| 2002/0065673 A1 | 5/2002 | Rooke | |
| 2003/0033431 A1 * | 2/2003 | Shinomiya .................. | 709/245 |
| 2003/0043178 A1 * | 3/2003 | Gusler et al. ............... | 345/705 |
| 2003/0046383 A1 * | 3/2003 | Lee et al. .................... | 709/224 |
| 2003/0088657 A1 * | 5/2003 | Eggers ........................ | 709/223 |
| 2004/0006617 A1 * | 1/2004 | Hikida et al. ............... | 709/223 |
| 2005/0064820 A1 * | 3/2005 | Park et al. ................ | 455/67.11 |
| 2005/0267868 A1 * | 12/2005 | Liebl et al. ..................... | 707/2 |
| 2006/0031584 A1 * | 2/2006 | McKinley et al. .......... | 709/246 |
| 2006/0155560 A1 * | 7/2006 | Chien .......................... | 705/1 |
| 2006/0184536 A1 * | 8/2006 | Jreij et al. .................... | 707/10 |
| 2007/0168464 A1 * | 7/2007 | Noonan et al. ............. | 709/218 |
| 2007/0174069 A1 | 7/2007 | Moore, Jr. et al. | |

(Continued)

FOREIGN PATENT DOCUMENTS

WO    WO 2013/056032    4/2013

OTHER PUBLICATIONS

Rasmussen et al. (Financial Business Intelligence—Trends, Technology, Software Selection, and Implementation [online] Dated 2002. [retrieved on Mar. 11, 2013] Retrieved from the Internet http://cs5937.userapi.com/u11728334/docs/ 677dd96d976c/Nils Rasmussen_Financial_Busines s_Intelligenc.pdf>).*

(Continued)

*Primary Examiner* — Razu Miah
(74) *Attorney, Agent, or Firm* — Fish & Richardson P.C.

(57) ABSTRACT

Among other things, a method includes a data storage system associated with a provider entity and storing data on behalf of a client entity, the data being accessible from the data storage system by the client entity, a data interface enabling access by the provider entity to the data of the data storage system, and an analysis engine maintained by the provider entity to, at times determined by the analysis engine, access the data using the data interface, analyze the data, and generate results of the analysis for use by the client entity.

42 Claims, 5 Drawing Sheets

(56) References Cited

U.S. PATENT DOCUMENTS

Figure 1:
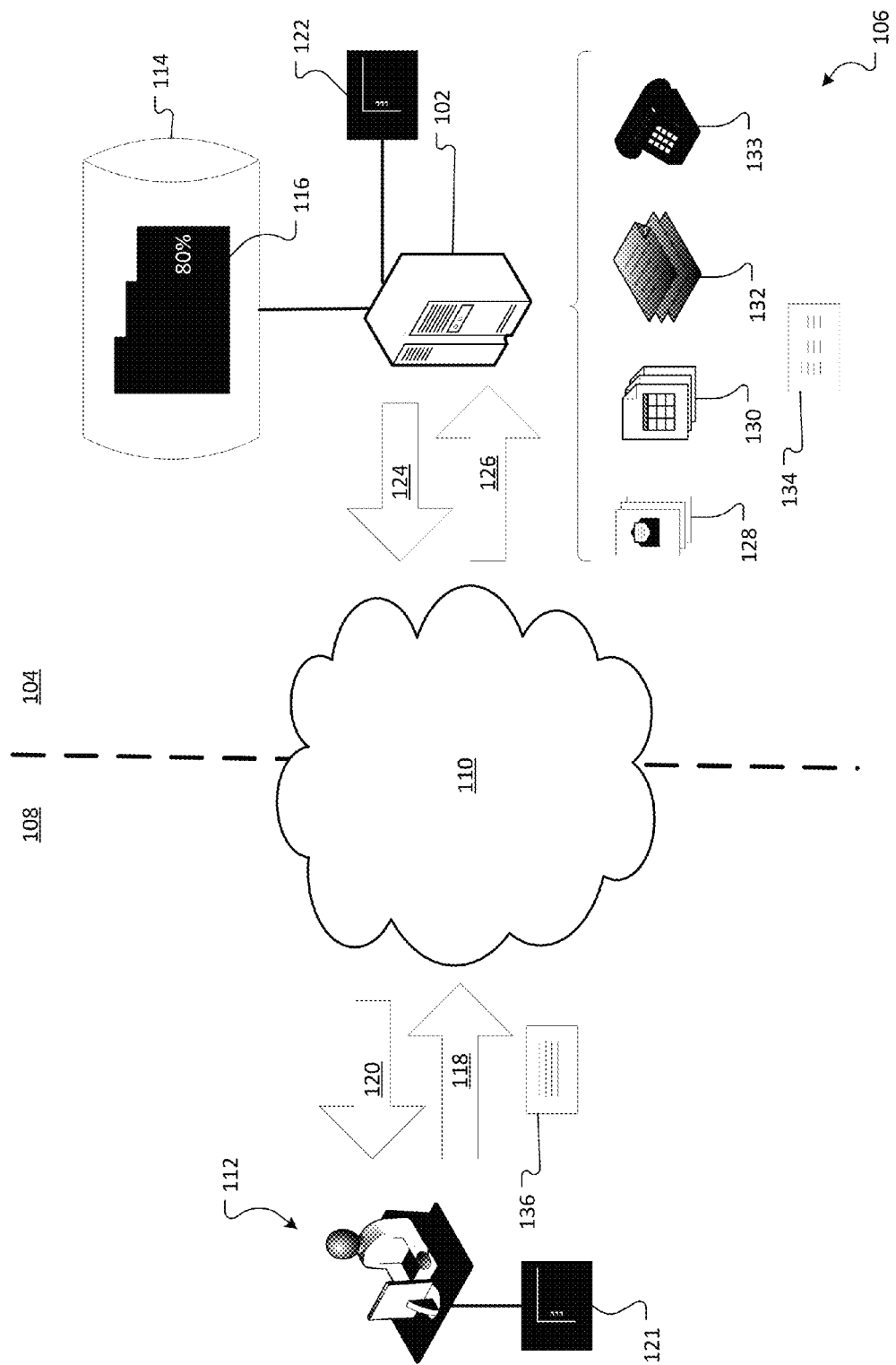

| | | | |
|---|---|---|---|
| 2007/0198635 A1* | 8/2007 | Lindner et al. | 709/203 |
| 2008/0028028 A1 | 1/2008 | Chismark | |
| 2008/0133654 A1* | 6/2008 | Kim et al. | 709/203 |
| 2008/0168132 A1* | 7/2008 | Chun | 709/203 |
| 2008/0168135 A1 | 7/2008 | Redlich et al. | |
| 2008/0172457 A1* | 7/2008 | Chen et al. | 709/203 |
| 2008/0250100 A1* | 10/2008 | Hatanaka et al. | 709/203 |
| 2008/0250101 A1* | 10/2008 | Tanaka et al. | 709/203 |
| 2009/0094319 A1* | 4/2009 | Lee et al. | 709/203 |
| 2009/0094321 A1* | 4/2009 | Ueda et al. | 709/203 |
| 2009/0133040 A1* | 5/2009 | Stevens, IV | 719/315 |
| 2009/0164888 A1* | 6/2009 | Phan | 715/248 |
| 2009/0187540 A1* | 7/2009 | Richardson et al. | 707/3 |
| 2009/0248490 A1* | 10/2009 | Moncreiff | 705/10 |
| 2009/0265420 A1* | 10/2009 | Hansen et al. | 709/203 |
| 2009/0307054 A1* | 12/2009 | D'Imporzano et al. | 705/10 |
| 2010/0027552 A1 | 2/2010 | Hill | |
| 2010/0030792 A1* | 2/2010 | Swinton et al. | 707/100 |
| 2010/0082532 A1* | 4/2010 | Shaik et al. | 707/609 |
| 2010/0114899 A1* | 5/2010 | Guha et al. | 707/741 |
| 2010/0185650 A1 | 7/2010 | Topatan et al. | |
| 2010/0235355 A1 | 9/2010 | Carter et al. | |
| 2010/0293147 A1 | 11/2010 | Snow et al. | |
| 2010/0332401 A1* | 12/2010 | Prahlad et al. | 705/80 |
| 2010/0332543 A1* | 12/2010 | Feng et al. | 707/781 |
| 2011/0010343 A1 | 1/2011 | Chavda et al. | |
| 2011/0055264 A1 | 3/2011 | Sundelin et al. | |
| 2011/0093471 A1 | 4/2011 | Brockway et al. | |
| 2013/0097203 A1 | 4/2013 | Bhattacharjee et al. | |
| 2013/0297519 A1 | 11/2013 | Brestoff et al. | |

OTHER PUBLICATIONS

BeyeNETWORK: Business Intelligence in the Cloud—A Spotlight Q&A with Dwight deVera of arcplan (originally published Oct. 10, 2011) [online], [retrieved on Oct. 13, 2011]. Retrieved from the Internet: http://www.b-eye-network.com/view/15545, 8 pages.

BusinessIntelligence.com: Latest News [online], [retrieved on Oct. 13, 2011]. Retrieved from the Internet: http://businessintelligence.com/, 2 pages.

Cloud Computing Topics: Business Intelligence in the Cloud (Sep. 20, 2011) [online], [retrieved on Oct. 13, 2011]. Retrieved from the Internet: http://cloudcomputingtopics.com/2011/09/business-intelligence-in-the-cloud/, 2 pages.

engadget: CloudSight Search gives you instant, unified access to email and social networking archives (Mar. 19, 2011) [online], [retrieved on Oct. 13, 2011]. Retrieved from the Internet: http://www.engadget.com/2011/03/09/cloudsight-search-gives-you-instant-unified-access-to-email-and/, 5 pages.

GoodData: Features (2011) [online], [retrieved on Oct. 13, 2011]. Retrieved from the Internet: http://www.gooddata.com/what-is-gooddata/features, 2 pages.

IBM: Business Analytics Software [online], [retrieved on Oct. 14, 2011]. Retrieved from the Internet: http://www-01.ibm.com/software/analytics/business-intelligence.html, 2 pages.

IBM: Information Archive for Email, Files and eDiscovery [online], [retrieved on Oct. 13, 2011]. Retrieved from the Internet: http://www-01.ibm.com/software/data/smart-archive/email-ediscovery.html, 2 pages.

Information Builders: Business Intelligence [online], [retrieved on Oct. 13, 2011]. Retrieved from the Internet: http://www.informationbuilders.com/business-intelligence, 2 pages.

Jaspersoft: Cloud BI [online], [retrieved on Oct. 13, 2011]. Retrieved from the Internet: http://www.jaspersoft.com/cloud, 1 page.

MicroStrategy: Alertive and Proactive Notification [online], [retrieved on Oct. 13, 2011]. Retrieved from the Internet: http://www.microstrategy.co.uk/bi-applications/5Styles/alerts.asp, 1 page.

Microsoft: Business Intelligence Overview [online], [retrieved on Oct. 13, 2011]. Retrieved from the Internet: http://www.microsoft.com/BI/en-us/Solutions/Pages/Product%20Overview.aspx, 3 pages.

Norwell: Proactive Reporting [online], [retrieved on Oct. 13, 2011]. Retrieved from the Internet: http://www.norwel.co.uk/news/Proactive-Reporting.html, 2 pages.

Odin Solutions: Proactive Reporting [online], [retrieved on Oct. 13, 2011]. Retrieved from the Internet: http://www.odinsol.com/support/reporting.shtml, 1 page.

Oracle: Business Intelligence Publisher Overview [online], [retrieved on Oct. 13, 2011]. Retrieved from the Internet: http://www.oracle.com/technetwork/middleware/bi-publisher/overview/index.html, 2 pages.

Realtalk: Useful & pro-active reporting [online], [retrieved on Oct. 13, 2011]. Retrieved from the Internet: http://www.norwel.co.uk/news/Proactive-Reporting.html, 1 page.

VentureBeat: Demo: We Are Cloud brings Business Intelligence to the masses (Sep. 13, 2011) [online], [retrieved on Oct. 13, 2011]. Retrieved from the Internet: http://venturebeat.com/2011/09/13/demo-we-are-cloud-brings-business-intelligence-to-the-masses/, 4 pages.

Wikipedia: Business Intelligence [online], [retrieved on Oct. 13, 2011]. Retrieved from the Internet: http://en.wikipedia.org/wiki/Business_intelligence, 10 pages.

ZL Technologies Inc.: ZL Unified Archiving in the Cloud [online], [retrieved on Oct. 13, 2011]. Retrieved from the Internet: http://www.zlti.com/products-services/zl-unified-archiving-cloud, 2 pages.

Rasmussen et al. "Financial Business Intelligence—Trends, Technology, Software Selection, and Implementation" [online] Dated 2002. [Retrieved on Mar. 11, 2013] Retrieved from the Internet <URL: http://cs5937.userapi.com/u11728334/docs/677dd96d976c/Nils_Rasmussen_Financial_Business_Intelligenc.pdf>, entire document, especially p. 76, para 1, 2; p. 77, para 2 to p. 79, para 1; p. 91, para 2; p. 96, para 2; p. 105, last para to p. 106, para 1; p. 151, para 6.

International Search Report and Written Opinion for App. Ser. No. PCT/US12/59930, dated Apr. 15, 2013, 13 pages.

International Preliminary Report on Patentability for App. Ser. No. PCT/US2012/59930, dated Apr. 15, 2014, 11 pages.

Application and PAIR Transaction History for U.S. Appl. No. 14/024,297, filed Sep. 11, 2013.

International Search Report and Written Opinion for App. Ser. No. PCT/US14/54709, mailed Dec. 4, 2014, 14 pages.

PAIR Transaction History for U.S. Appl. No. 14/024,297, filed Sep. 11, 2013.

* cited by examiner

ANALYZING STORED ELECTRONIC COMMUNICATIONS

BACKGROUND

This description relates to analyzing client data stores.

SUMMARY

The analysis of client data stores that we describe here may encompass one or more of the following (and other) aspects, features, and implementations, and combinations of them.

In general, in an aspect, a method includes at a provider entity, storing data on a data storage system on behalf of a client entity, the data being accessible from the data storage system by the client entity, and performing an ongoing analysis of the data and generating results of the analysis for use by the client entity, the data being accessed at times determined by the provider entity.

Implementations may include one or more of the following features. The analysis is performed based on preferences of the client entity. The analysis comprises an identification of patterns in the data. The results are provided to the client entity at times based on characteristics of the results. The results generated based on two instances of data analysis each performed at two different times. The data is accessible from the data storage system by the client entity on a network shared with entities other than the client entity and the provider entity.

In general, in another aspect, a method includes receiving, from a client entity, data of distinct data systems associated with the client entity, processing the data from the distinct data systems for storage on a single data storage system, and enabling access by the client entity to the processed data and by an analysis engine associated with the data storage system.

Implementations may include one or more of the following features. The data of at least one of the distinct data systems is formatted in a data format proprietary to the respective distinct data system. The data of one of the data systems is formatted in a first data format and the data of another of the data systems is formatted in a second data format. The access by the client entity to the processed data is enabled by a single interface to the data. The single data storage system comprises a plurality of coordinated physical computer systems.

In general, in another aspect, a method includes receiving, from a client entity, data of a plurality of data systems, processing the data for use by applications executing on a single data storage system and for analysis by an analysis mechanism associated with the data storage system, and enabling access by the client entity to the applications.

Implementations may include one or more of the following features. At least one of the applications stores data in a first data format and data of at least one of the data systems is formatted in a second data format. The single data storage system comprises a plurality of coordinated physical computer systems.

In general, in another aspect, a method includes receiving, from a client entity, data of distinct data systems associated with the client entity, processing the data from the distinct data systems for storage on a single data storage system and for use by applications executing on the data storage system, and enabling access by the client entity to the processed data and the applications, and enabling access by an analysis engine associated with the data storage system to the processed data.

Implementations may include one or more of the following features. The access to at least some of the processed data is provided using at least one of the applications. The single data storage system comprises a plurality of coordinated physical computer systems.

In general, in another aspect, a method includes a data storage system associated with a provider entity and storing data on behalf of a client entity, the data being accessible from the data storage system by the client entity, a data interface enabling access by the provider entity to the data of the data storage system, and means for the provider entity to, on behalf of the client entity, analyze portions of the data received at times determined by the provider entity.

Implementations may include one or more of the following features. The portions of the data are analyzed based on preferences of the client entity. At least some of the portions of the data are associated with a specified period of time at which the data was stored on the data storage system.

In general, in another aspect, a method includes at a provider entity, storing data on a data storage system on behalf of a client entity, the data being accessible from the data storage system by the client entity, performing an analysis of the data based on preferences of the client entity and generating results of the analysis for use by the client entity, the data being accessed at a plurality of times determined by the provider entity, and delivering the results to the client entity at times based on characteristics of the results.

In general, in another aspect, a method includes at a client entity, transmitting data from data systems of the client entity to a data system of a provider entity, accessing the data at the data system of the provider entity, and receiving results of analyses of the data at the data system of the provider entity, the results received at times determined by the provider entity based on preferences of the client entity.

In general, in an aspect, an apparatus includes a data storage system associated with a provider entity and storing data on behalf of a client entity, the data being accessible from the data storage system by the client entity, a data interface enabling access by the provider entity to the data of the data storage system, and an analysis engine maintained by the provider entity to, at times determined by the analysis engine, access the data using the data interface, analyze the data, and generate results of the analysis for use by the client entity.

Implementations may include one or more of the following features. The apparatus includes a client interface to enable the access to the data of the data storage system by the client entity. The apparatus includes a client interface to receive updates of the data from the client entity. The analysis is performed based on preferences of the client entity. The analysis is performed on a subset of the data that is associated with a specified period of time. The analysis comprises an identification of patterns in the data. The data received from the client entity comprises electronic messages. The results are provided to the client entity in electronic messages. The results are provided to the client entity at times based on characteristics of the results. The characteristics of the results comprise an event identified by the analysis engine as a priority event. The data storage system stores data received from a second client entity. The data received from the client entity is not accessible to the second client entity. The analysis engine generates the results partially based on an analysis of the data received from the second client entity. The provider entity is independent of the client entity. The client entity comprises a commercial enterprise. The results are generated based on two instances of data analysis each performed at two different times.

In general, in an aspect, an apparatus includes a data storage system associated with a provider entity and storing data on behalf of a client entity, a client interface enabling access to the data of the data storage system by the client entity, and an analysis engine maintained by the provider entity to, at times determined by the analysis engine, access the data using the client interface, analyze the data, and generate results of the analysis for use by the client entity, the results of the analysis being determined based on preferences of the client entity and provided to the client entity at times determined by the analysis engine based on characteristics of the analysis.

In general, in an aspect, an apparatus includes a data storage system associated with a provider entity and storing data on behalf of a client entity, the data being accessible from the data storage system by the client entity, and being accessible from the data storage system by the provider entity at times determined by the provider entity for the provider entity to perform continuous analysis of the data with permission of the client entity.

In general, in an aspect, an apparatus includes a software interface maintained by a provider entity and providing access to the a provider entity to data stored by a data storage system on behalf of a client entity, wherein the extent of the access is tailored to applications that access and analyze the data at times determined by the provider entity.

These and other aspects, features, and implementations, and combinations of them, may be expressed as apparatus, methods, methods of doing business, means or steps for performing functions, components, systems, program products, and in other ways.

Other aspects, features, and advantages will be apparent from the description and the claims.

DESCRIPTION

Figure 2:
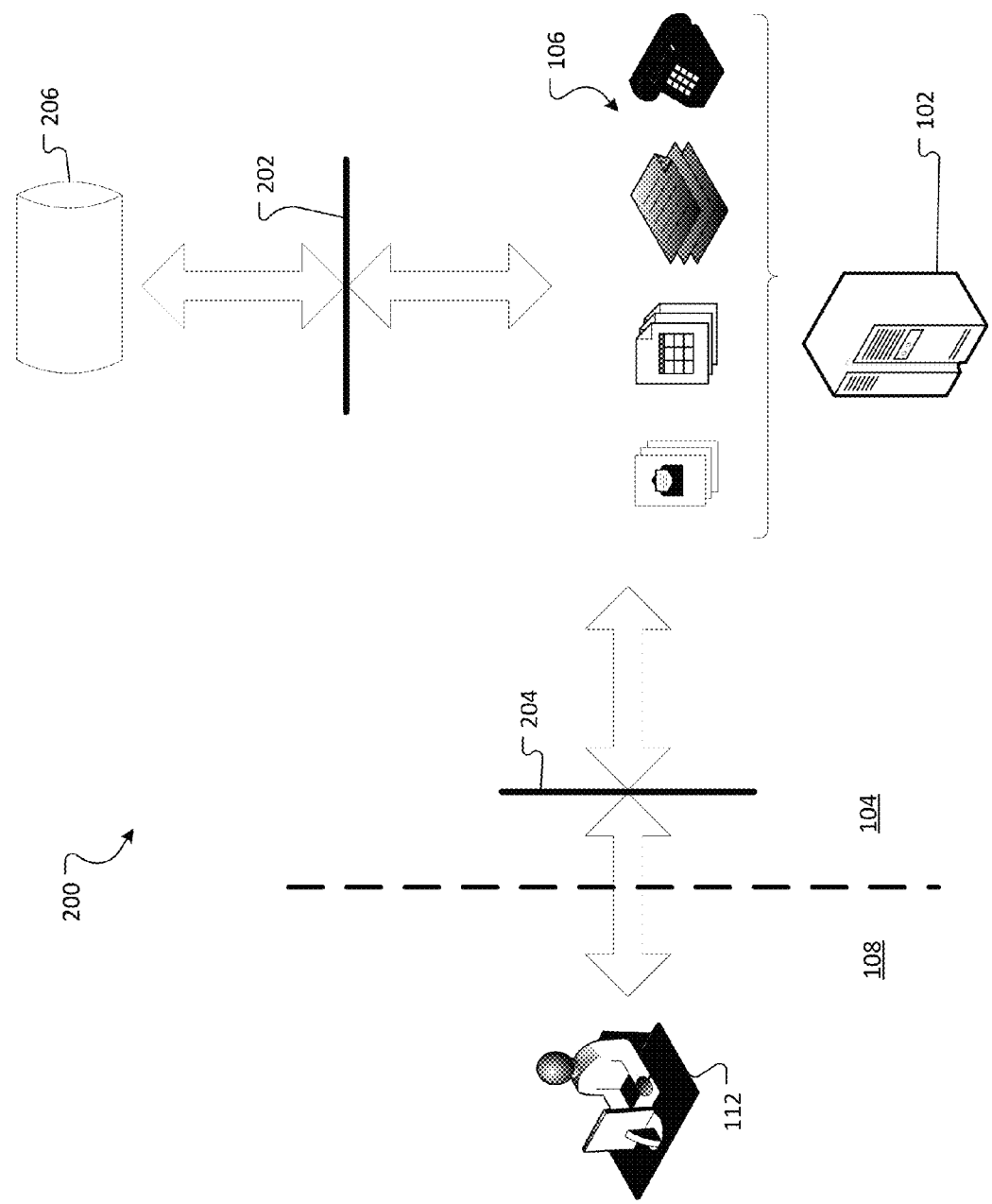
Figure 3:
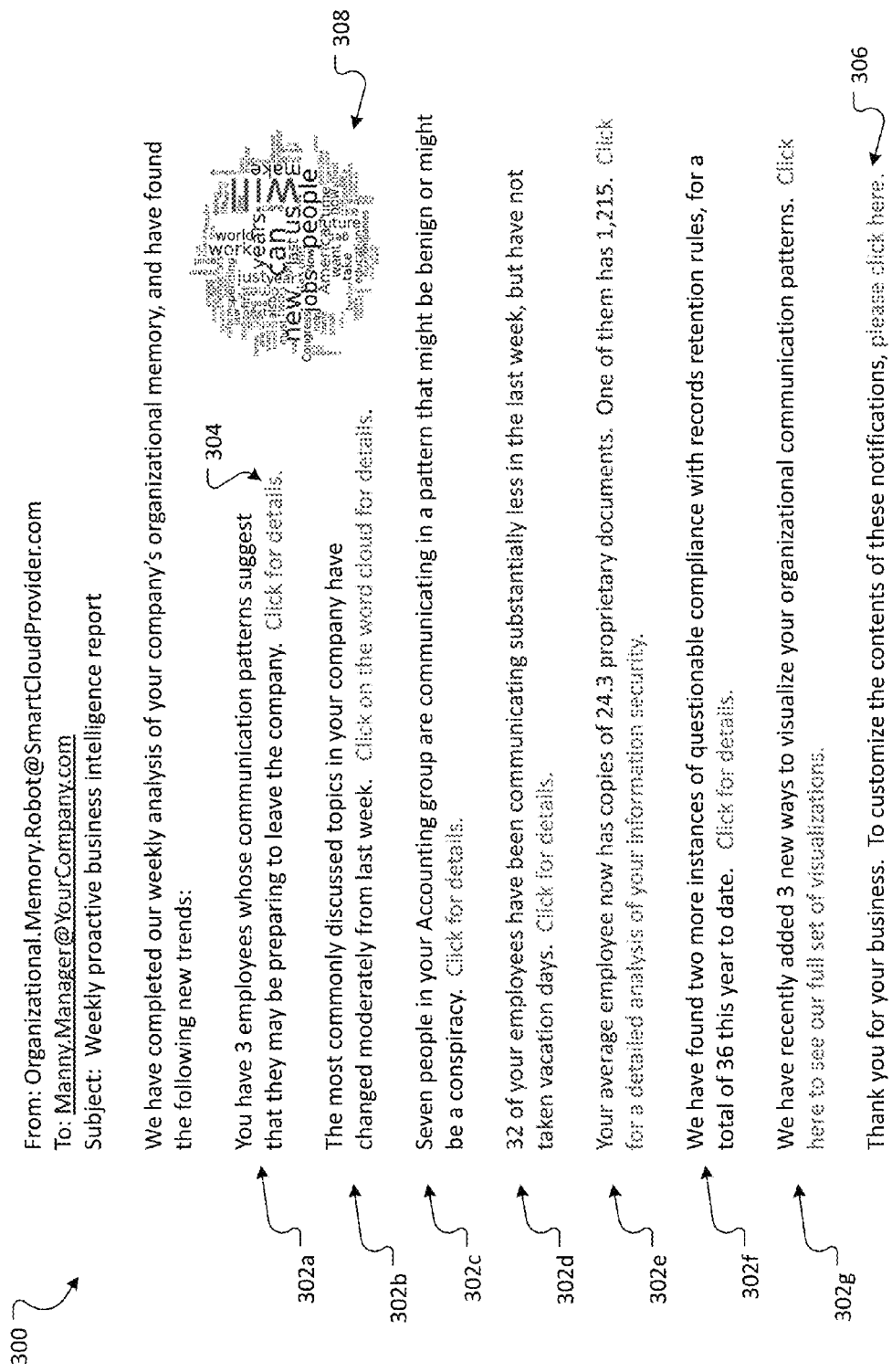
Figure 4:
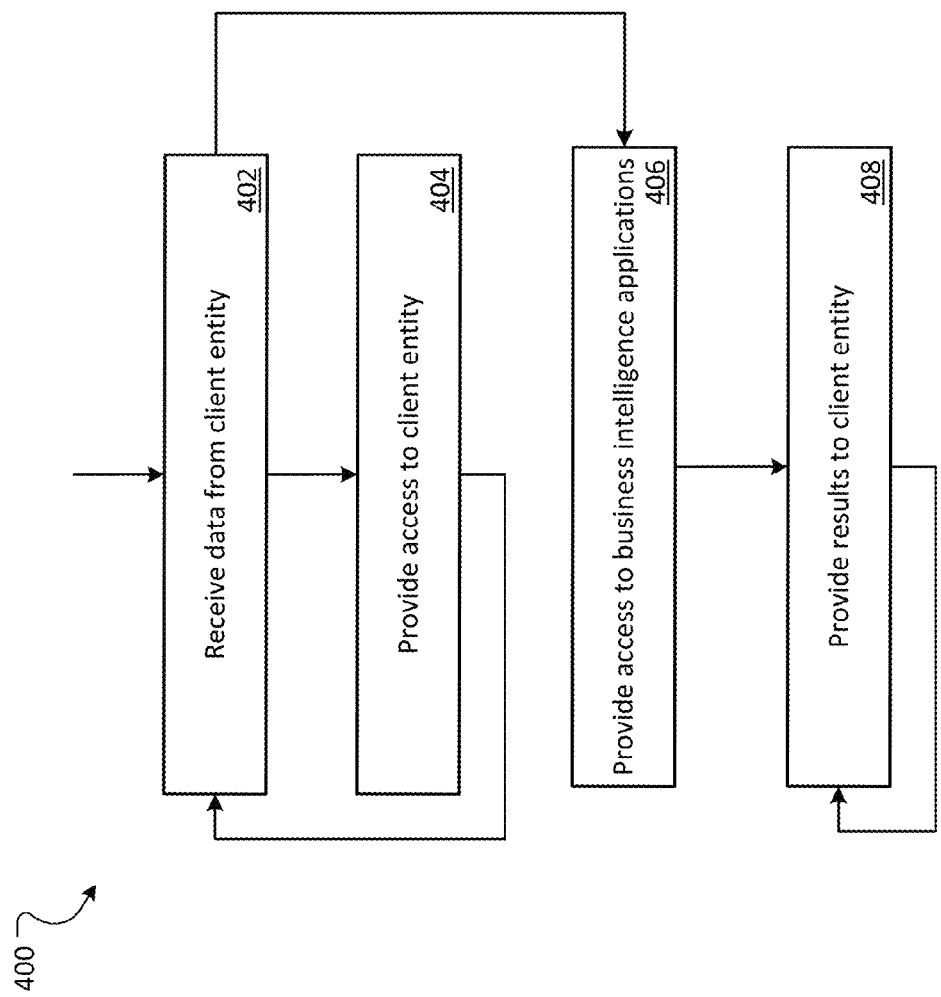
Figure 5:
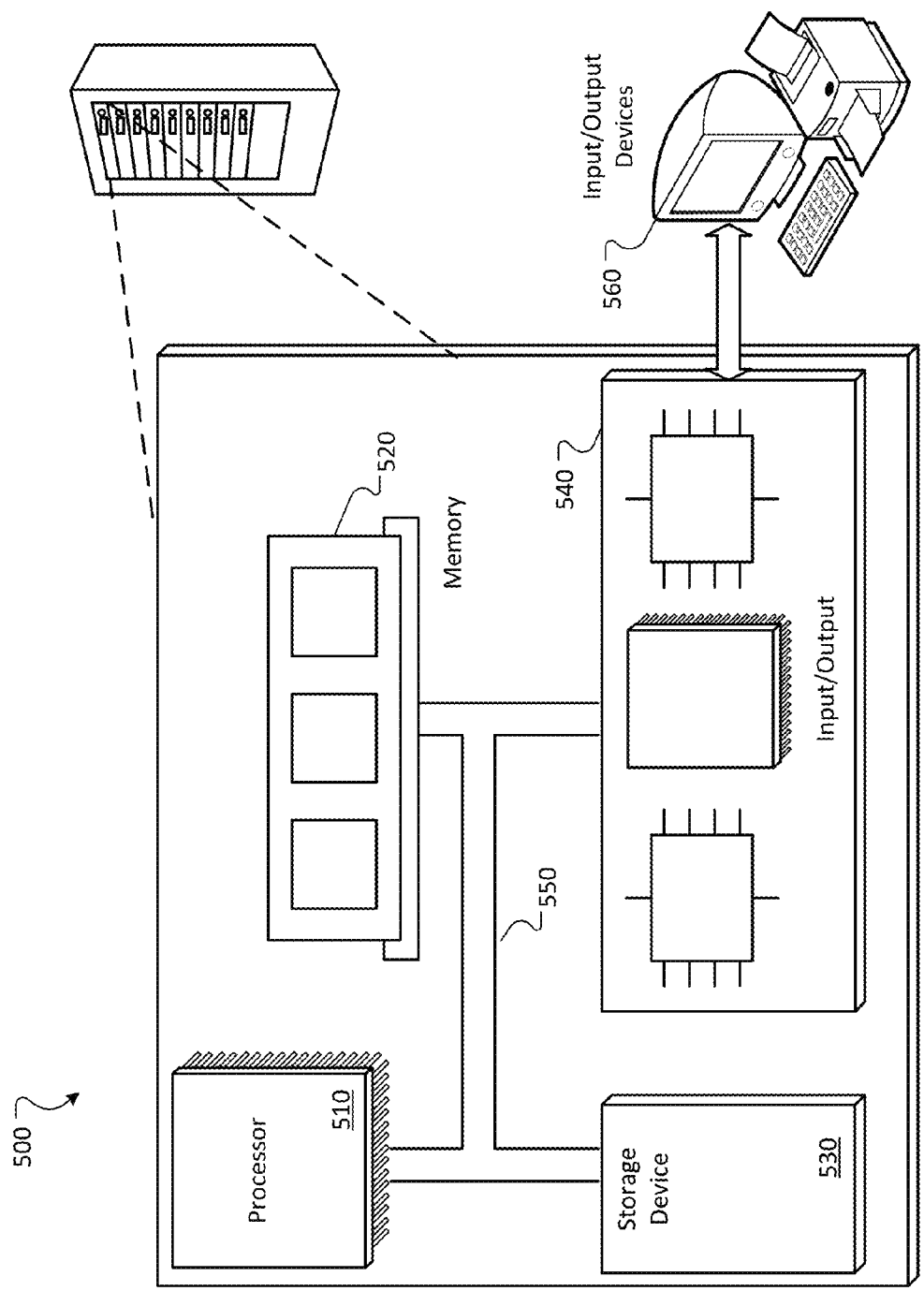

FIGS. 1 and 2 are block diagrams.
FIG. 3 is a report.
FIG. 4 is a flowchart.
FIG. 5 is a block diagram.

A modern business or organization may have a large amount of data in the form of email messages, text documents, spreadsheets, human resources records, payroll databases, and other kinds of information. This data can be collectively analyzed over time to extract intelligence about the organization. For example, the analysis can be done by an analysis system that can determine intelligence about a wide variety of information related to the organization including, for example, information about the organization's communication patterns, the organization's information security, the organization's employee behavior, and other intelligence. Some analysis systems aggregate the data from a variety of the organization's data sources using multiple interfaces.

Analyzing data can mean providing data to a computer program or other executable process, which then examines the data to identify patterns of interest. Further, intelligence is an interpretation of the patterns. The intelligence can be inferences of what the patterns imply, based on previous occurrences of the patterns. The interpretations can be very high-level. For example, if a particular word or phrase appears more frequently in an organization's email messages over a period of time, then one interpretation of this pattern is that a concept described by the word or phrase has become more important to the organization over this period of time.

The computer program may accept data at discrete times (for example, once a minute, once an hour, or other intervals), but patterns of interest may only be identifiable over a period of time longer than the intervals. For example, a pattern of interest may be identified after a week or a month, which could constitute dozens or hundreds or more discrete periods of data analysis. Thus, the computer program may store information about multiple sessions of data analysis and look back at results gleaned from previous sessions to identify a pattern evident over time. This process of analyzing data over a period of many sessions can occur on an ongoing basis, so that the analysis of data can constitute an analysis of data over the past week, the past year, or any period of time beginning when the first analysis was commenced.

In at least some implementations of what we describe here, if the organization's data is placed in a single data store administered by a service provider that also operates the analysis system then the amount of overhead expended to extract intelligence from the organization's data may be reduced. In some examples, the organization can provide all of its data to the single data store and use a single interface (for example, an application programming interface) to access and update its data at will. In some cases, because the single data store is operated by the service provider that operates the analysis system, the service provider can develop and maintain its own single interface (for example, for its analysis system) to the organization's data. In some implementations, the analysis system will be able to access the full range of the organization's data at will (i.e., at any time) within the bounds of any information security policies specified by the organization. The analysis system can then proactively provide business intelligence back to the organization over time as the analysis is performed on an ongoing basis. Here, actions performed proactively are done at times determined by the analysis system, rather than on request by another entity such as a user.

A data store is a facility that retains and provides access to data. Data is any representation of information that can be stored, displayed, and processed by a computer system. Generally, most or all of the data resident on a data store is accessible in the same way. For example, those with access to the data will use the same technique or interface to access different portions of the stored data. The data store itself may be a collection of many storage devices (e.g., hard drives, solid state storage units, or other types of devices) and may be made up of many computer systems, and the computer systems may be located at multiple physical locations, but the data store itself functions as a single unit.

FIG. 1 shows an example of a data storage facility 102 (i.e., a data store as described above) operated by a service provider 104 that stores data 106 belonging to a client entity 108. The data 106 can be data of many types and originating from many types of data storage and processing systems. For example, the data 106 can be e-mail messages and attachments, text documents, spreadsheets, databases, images, audio, video, or any other kind of data. The data 106 may originate from e-mail systems, payroll systems, human resources records, and other sources of data used by the client entity 108. Thus, the data 106 could originate from multiple proprietary data systems, but then can be transferred to the data storage facility 102, which is a single system capable of storing and processing data originating from multiple kinds of data systems. The client entity 108 could use the data storage facility 102 to store all of its data, and retain no data on any system other than the data storage facility 102.

Here, the client entity 108 chooses to use the data storage facility 102 in lieu of operating its own data processing and storage facilities. For example, the service provider 104 can be an information technology company or other organization that manages data storage and processing facilities for other organizations, and the client entity 108 can be a company or other organization that has hired the service provider 104 to maintain (and in some cases process) the data 106 for the client entity 108. Although the data storage facility 102 is described in terms of data storage, the data storage facility 102 generally also performs data processing tasks as well. As described herein, the data storage facility 102 can operate software applications and other executable programs to process data on behalf of the service provider 104 (e.g., to perform business intelligence analysis) and to process data on behalf of the client entity 108 (e.g., to run software applications used by the client entity to modify its data). In some examples, the data storage facility 102 may have more resources dedicated to data processing than dedicated data storage. In FIG. 1, the boundary between the resources of the service provider 104 and the resources of the client entity 108 is indicated by a dashed line 109. Here, "resources" can mean computer systems, human beings using the computer systems, or other resources. Usually, when it is said here that the service provider 104 or the client entity 108 takes an action, it is one or more of the resources of the respective entity that is taking the described action.

In some examples, the data storage facility 102 may be a computing device such as a server, or the data storage facility 102 may be a distributed system including multiple servers, or the data storage facility 102 may be any other kind of system that can store, send, and receive data. Because the service provider 104 operates the data storage facility 102, the data storage facility 102 may be located at a physical location under the control of the service provider 104, rather than located at a physical location under the control of the client entity 108. If the data storage facility 102 is a distributed system including multiple servers, the data storage facility 102 may be located at several physical locations under the control of the service provider 104, or the client, or a combination of the two. In some examples, the data storage facility 102 or portions of the data storage facility 102 could be located at one or more physical locations that are hundreds or thousands of miles away from any resource of the client entity 104.

In some implementations, a portion of the data storage facility 102 may be operated by an entity other than the service provider 104. For example, the service provider 104 may hire a subcontractor to maintain a portion of the data storage facility 102. In some implementations, the service provider 104 has control over the entire data storage facility 102 including portions operated by another entity.

In some implementations, the service provider 104 and the client entity 108 both have access to the data 106 stored by the data storage facility 102. The data storage facility 102 is accessible to the client entity 108 using a network 110. The network 110 can be a public network shared with entities other than the service provider 104 and the client entity 104. For example, the network 110 could be the Internet, which is accessible to millions of entities worldwide and carries data sent and received by the millions of entities. A network 110 is any mechanism by which multiple discrete computer systems can communicate amongst themselves. From the perspective of a user 112 associated with the client entity 108, the data 106 stored by the data storage facility 102 is fully accessible in the same or a similar manner as if the data 106 were stored by a facility client entity 108. Further, even if the data 106 originated at different distinct systems operated by the client entity 108, the data 106 resides on a single system in the form of the data storage facility 102. Going forward, the user 112 has access to the data 106 in the same manner as the user 112 had before the data 106 was transferred to the data storage facility 102, even though the data storage facility 102 is accessible using the network 110 rather than accessible locally to the user 112.

For example, if the client entity 108 is a business and the user 112 is an employee of the client entity 108, then the user 112 has full and complete access to the data that he uses over the course of performing his regular duties as an employee. Further, the user 112 has access to the data 106 from any location that has access to the network 110. The data storage facility 102 provides the user 112 (and other resources associated with the client entity 108) with complete access to any of the data 106, within any authorization or security constraints established by the client entity 108 for its users. Here, "complete access" constitutes the ability for a user 112 to read, write, and update data stored, on behalf of the client entity 108, at the data storage facility 102 without limitation imposed by the service provider 104. Because the user 112 accesses data using the network 110, the user 112 may not be aware that the data that he accesses is stored by a data storage facility 102 under control of the service provider 104.

In some implementations, the resources of the client entity 108 do not have full access to the data 106. For example, the data 106 provided by the client entity 108 may be restricted by security policies, regulatory regimes, or other restrictions. The resources of the client entity 108 may be prevented from performing certain actions on the data such as encrypting and decrypting the data. The resources of the client entity 108 may be prevented from deleting data which is governed by a records retention policy requiring that data not be deleted for a period of time. The data storage facility 102 may be configured to enforce security policies, regulatory regimes, or other restrictions.

In some examples, the service provider 104 also has access to the data 106 stored on the data storage facility 102 on behalf of the client entity 108. In some cases, the service provider 104 can read the data 106 without any restrictions (i.e. so that the service provider 104 may analyze the data at will). In some implementations, the client entity 108 may establish security settings for its data that exclude the service provider 104 from reading some portion of the data 106. In some implementations, the service provider 104 has the same complete access to the data 106 as does the client entity 108. In some implementations, the service provider 104 only has access that enables the service provider 104 to read the data 106, but not write or update the data 106. These restrictions may be technologically enforced, policy-based and organizationally enforced, or both.

The service provider 104 can use its access to the data 106 stored on the data storage facility 102 on behalf of the client entity 108 to analyze the data 106. For example, the service provider 104 can perform an analysis directed to extracting business intelligence for the client entity 108 based on the data 106 of the client entity 108. Generally, business intelligence is an evaluation of the operations of a business or other organization and can provide information about the organization, for example, insight on the organization's internal processes. In some implementations, business intelligence is determined by examining an organization's data over time on an ongoing basis. For example, the way in which data changes over time can provide insight on the organization's ongoing processes. Business intelligence technology includes the collection of large amounts of data and the extraction of key facts and inferences from that data.

Except during rare instances of outages, the network 110 serves as a conduit for a user 112 of the client entity 108 to access the data 106 on demand at any time (e.g., 24 hours a day, 7 days a week). The client entity's access to the data is not limited in time by this arrangement. Further, the service provider 104 also has access to the data 106 at all times, which allows the data storage facility 102 to perform analyses on the data 106 at any time for arbitrary time periods (chosen by the service provider 104) without interruption. Any configuration of limitations on the service provider 104 and on the client entity 108 is also possible.

The analysis of the data 106 can be performed by business intelligence applications 114 operating in association with the data storage facility 102. The business intelligence applications 114 are enabled to access the data 106 by the data storage facility 102. In some implementations, the business intelligence applications 114 may be applications operating within the environment of the data storage facility 102. For example, if the data storage facility 102 is a computer system such as a server or collection of servers, the business intelligence applications 114 may be applications that are stored on the computer system and are executed by the computer system. In some implementations, the business intelligence applications 114 are executed by a system other than the data storage facility 102. The business intelligence applications 114 may include applications that analyze communications of members of an organization (e.g., employees), applications that analyze quality of work product of members of an organization, applications that analyze compliance with organization policies such as security policies or regulatory policies, applications that analyze efficiency of an organization's operations, as well as many other types of applications. The applications can be general purpose applications used by any organization or the applications can be custom-tailored applications specific to an organization.

The business intelligence applications 114 produce output in the form of business intelligence reports 116. The business intelligence reports 116 present an analysis of the data 106 in a form useful to a human reader. For example, the business intelligence reports 116 can be provided by the business intelligence applications 114 on a regular basis to one or more individuals (for example, one of the users 112) associated with the client entity 108. For example, the individuals may be officers of the organization such as executives of a corporation, or the individuals may be technicians of the organization such as system administrators, or the individuals may be system analysts of the organizations charged with improving operations of the organization, or other types of people.

A user 112 associated with the client entity 108 can send 118 and receive 120 data to and from the data storage facility 102 by way of the network 110. In some implementations, the data storage facility 102 functions as data storage used in connection with executable applications (e.g., computer programs) that operate at the client entity 108, for example, applications 121 operating on computer systems operated by the client entity 108. The applications can access the data 106 stored by the data storage facility 102 in the same or similar manner as if the data 106 were stored by a system operated by the client entity 108. For example, the user 112 can execute a word processing application at a local computer system and use the word processing application to edit files stored by the data storage facility 102. In some implementations, the data storage facility 102 is also an execution environment for applications 122. A user 112 associated with the client entity 108 can access applications 122 executed by the data storage facility 102 to access and manipulate the data 106 stored by the data storage facility 102. For example, one of the applications 122 can be an email application that executes at the data storage facility 102, and the user 112 associated with the client entity 108 can access the email application using a web browser or other network-based user interface. Many other arrangements of applications executing at either the service provider 104 or client entity 108 are possible.

The data 106 stored by the data storage facility 102 can include any kind of data used by the client entity 108, for example, email messages 128, database tables 130, documents 132, and voice messages 133 (voice recordings). In some examples, the majority of the data 106 stored on behalf of a client entity 108 will be email messages 128 representing communications between users of the client entity 108 and attachments (e.g., documents) to the email messages 128.

The data 106 can also include metadata 134, which is data describing attributes of other data. For example, metadata 134 can include attributes such as security attributes of data documents, e.g., which users of the client entity 108 have security authorization to access certain documents or other data. Metadata can also include indexing data and provenance data. For example, the metadata can describe the origin of particular pieces of data. If the data originated in another system such as a proprietary data system, the metadata 134 may include information describing the proprietary data system. In some examples, the metadata 134 can also include information about licensing and copyright, to support digital rights management mechanisms.

In some implementations, the data 106 may be altered by the data storage facility 102 when data is received from the client entity 108. For example, the data storage facility 102 may convert the data to a format or other arrangement used by the data storage facility 102. In some examples, a collection of data having the same type (e.g., a collection of email messages) but having multiple formats (e.g., a collection of email messages stored in formats used by multiple email applications) may be converted to a single format. In some implementations, the data 106 may be altered for security reasons, for example, the data 106 may be scanned regularly for viruses or other malicious content. The data may be altered for other reasons, for example, normalization of character sets, translation of language, textual annotation of speech or video, reformatting and indexing the data, relocating the data into a database system (e.g. to utilize search capabilities of the database system), or other reasons.

The data storage facility 102 sends 124 and receives 126 data to and from the client entity 108 using the network 110. The business intelligence applications 114 operating in association with the data storage facility 102 can send the business intelligence reports 116 to the client entity 108 on a regular schedule such as daily or hourly, or the business intelligence reports 116 may be requested on demand by a user 112 associated with the client entity 108. The user 112 can also send configuration data 136 to the data storage facility 102. For example, the configuration data 136 can indicate a schedule to receive the business intelligence reports 116, and the configuration data 136 can indicate particular categories of business intelligence data that the user 112 wishes to receive. The configuration data 136 can also indicate events of interest to the user 112 that will trigger the transmission of a business intelligence report 116. For example, the ongoing analysis performed by the business intelligence applications 114 may identify patterns representative of security concerns. The identification of such a pattern can trigger the transmission of a business intelligence report 116 indicating the security concerns to one or more users from the organization of the client entity 108.

In some implementations, the data storage facility 102 contains data of multiple clients other than the client entity 108. For example, the service provider 104 may provide data storage services to multiple business or other organizations, and those organizations can have a relationship to the service provider 104 of a type similar to the relationship between the client entity 108 and the service provider 104 described above. Generally, the client entity 108 does not have access to data stored by the data storage facility 102 on behalf of entities other than the client entity 108. In some examples, the data storage facility 102 generates business intelligence reports 116 based on an analysis of the data 106 of the client entity 108 and also based on an analysis of data of entities other than the client entity 108. For example, the business intelligence reports 116 based on multiple analyses in this fashion may be done in an anonymous fashion, so that the client entity 108 receiving the business intelligence reports 116 cannot identify that data of the other entities were used. In some implementations, the business intelligence reports 116 may include information about how the operations of the client entity 108 compare to operations of other entities in an industry or field of the client entity 108, based on data stored by the data storage facility 102 on behalf of other entities in the same industry or field.

FIG. 2 shows a block diagram 200 of an interaction between resources of the service provider 104 and resources of the client entity 108. Resources of the service provider 104 can access the data 106 stored on behalf of the client entity 108 by the data storage facility 102 using one interface 202, and resources of the client entity 108 can access the data 106 stored on behalf of the client entity 108 by the data storage facility 102 using another interface 204. Each interface 202, 204 is a mechanism that provides a certain level of access to the data 106 under a defined set of protocols. For example, an interface may provide access to some portion of the data (or all of the data), and may enable protocols usable to read the data, modify the data, or augment the data (e.g., write new data).

Generally, the interface 204 used by the client entity 108 provides the resources of the client entity 108 with complete access to the data 106. For example, a user 112 associated with the client entity 108 can use the interface 204 to read from the data 106 or write to the data 106 at any time. For example, the interface 204 may allow the user 112 to receive a data file which the user 112 then modifies, and the interface 204 may then allow the user 112 to transmit the modified data file back to the data storage facility 102. In some implementations, the interface 204 may serve as a portal for an executable application operating at the client entity 108 to read from and write to portions of a data file that resides permanently at the data storage facility 102. The interface 204 used by the client entity 108 can serve as a single, integrated point of access to the data 106 for the client entity 108.

The interface 202 used by the service provider 104 provides the resources of the service provider 104 with a degree of access to the data 106. In some implementations, the service provider 104 has complete access to the data 106 and can read and write any of the data 106. In some implementations, the service provider 104 can read the data 106 but generally cannot write to the data 106. For example, if a resource of the service provider 104 only accesses the data 106 to perform an analysis on the data, then the service provider 104 will not need access sufficient to modify the data 106. A business intelligence application 206 operating in association with the data storage facility 102 can use the interface 202 to read from the data 106 when performing an analysis on behalf of the client entity 108. The interface 202 used by the service provider 104 can serve as a single, integrated point of access to the data 106 for the service provider 104.

In some implementations, each interface 202, 204 is an application programming interface (API). An API specifies a set of functions that an operator of the interface can use to access resources exposed by the API. For example, each interface 202, 204 may specify functions usable to read data and other functions usable to write data. In some implementations in which each interface 202, 204 is an API, each interface may specify functions each directed to a different data format. For example, the interface may specify functions usable to read and write email messages, and the interface may also specify functions usable to read and write database tables. In some implementations, the interface may specify functions usable by particular types of executable applications. For example, each interface 202, 204 may specify functions usable by web-based applications. The interface may also specify functions that read and write generic objects, such as MIME objects, which may contain any kind of data. The interface may also include authentication information at any or every stage of a data exchange, for example, to verify that the interface 202, 204 is being used by the respective entity for which it is intended.

Generally, each interface 202, 204 is provided and maintained by the service provider 104. For example, each interface 202, 204 may be a resource that resides on the data storage facility 102 and has functionality chosen by the service provider 104. Because the service provider 104 chooses the functionality of the interface 202 that the service provider 104 itself uses to access the data 106, technical limitations of the interface 202 do not pose an obstacle to resources of the service provider 104 that access the data 106. For example, a business intelligence application 206 that analyses the data 106 can operate under the application's full range of functionality related to data analysis in a way that is not limited by features of the interface 202. The functionality of the interface 202 can be tailored to the functionality of the business intelligence application 206. The interface 202 can be configured to provide any kind of data to the business intelligence application 206 and in any form the business intelligence application 206 uses.

FIG. 3 shows an example of a business intelligence report 300. In this example, the business intelligence report 300 is an electronic message (e.g., an email) provided to a user of the client entity. The business intelligence report 300 presents results of an analysis of data 106 stored by a data storage facility 102 on behalf of a client entity 108 (FIG. 1). Because the data storage facility serves as the primary data storage mechanism for the client entity, the analysis represented in the business intelligence report 300 can be comprehensive. In other words, the business intelligence report 300 can describe information relating to any aspect of operations of the client entity that are discoverable by data analysis.

The business intelligence report 300 includes analysis summaries 302a-g, each indicating a result of analysis (e.g., performed by a business intelligence application such as the business intelligence application 114 shown in FIG. 1). The business intelligence report 300 also includes a link 306 to a configuration facility that allows a user to identify which types of analysis summaries he wishes to receive. For example, the link 306 may allow the user to specify configuration data 136 to be sent to the data storage facility 102 (FIG. 1). In some implementations, the user can indicate a specified period of time over which an analysis is to be performed. For example, the user may wish to receive weekly analysis summaries, which can indicate the result of an analysis of the past week's data (e.g., data that is new or has been updated as of the past week). In some implementations, the user can specify that he wishes to receive an analysis summary when certain events occur. For example, a business intelligence application can monitor characteristics of data undergoing analysis and identify events that the user has identified as priority events. An example of a priority event may be an event that indicates an information security concern. In this way, the business intelligence report 300 can be provided in a proactive manner, whereby an analysis is provided to a user associated with the client entity at times determined as appropriate based on the results of the analysis and the user's preferences for receiving information.

In some implementations, a business intelligence report 300 can include a word cloud 308 that indicates particular words that appear frequently in the data used in the generation of the business intelligence report 300 or have otherwise been determined to be relevant to the data used in the generation of the business intelligence report 300. In some examples, words in the word cloud 308 can be sized according to frequency. For example, words that appear most frequently can be displayed larger than words that appear less frequently.

One analysis summary 302a provides information about employee communication patterns. Here, the analysis summary 302a indicates that employees may be preparing to leave the company. For example, the analysis summary 302a may have been compiled based on electronic message (i.e. email) data available on the data storage facility. The analysis summary 302a includes a link 304 that a user can access to view details of the analysis. For example, the link 304, when accessed by a user, may present details about how the analysis was performed, details about results of the analysis, provisions for the user to adjust the type of analysis performed, and other details.

One analysis summary 302b provides information about employee discussion topics. Here, the analysis summary 302b indicates that employee discussion topics have changed in the last week. For example, the analysis summary 302b may have been compiled based on electronic message (i.e. email) data available on the data storage facility.

One analysis summary 302c provides information about employee communication patterns. Here, the analysis summary 302c indicates that certain employees might be engaged in illicit behavior. For example, the analysis summary 302c may have been compiled based on electronic message (i.e. email) data available on the data storage facility.

One analysis summary 302d provides information about employee communication rates. Here, the analysis summary 302d indicates that certain employees have communicated substantially less in the last week but have not taken vacation days, implying that they may not be operating at full capacity. For example, the analysis summary 302d may have been compiled based on electronic message (i.e. email) data available on the data storage facility.

One analysis summary 302e provides information about employee document security. Here, the analysis summary 302e indicates that one employee has possession of a large number of proprietary documents compared to the average, indicating that the employee may be an information security hazard point. For example, the analysis summary 302e may have been compiled based on document metadata (i.e. data about data documents) available on the data storage facility.

One analysis summary 302f provides information about records retention rule compliance. Here, the analysis summary 302f indicates that the analysis has identified two more incidents of questionable compliance with the records retention rules, indicating a possible compliance concern. For example, the analysis summary 302f may have been compiled based on document metadata (i.e. data about data documents) available on the data storage facility, and based on changes made to the data available on the data storage facility.

One analysis summary 302g provides information about organizational communication patterns. Here, the analysis summary 302g indicates that new ways of visualizing the organizational communication patterns are available for viewing. For example, the analysis summary 302g may have been compiled based on electronic message (i.e. email) data available on the data storage facility, and based on changes made to the data available on the data storage facility.

Other types of analysis summaries are possible. In some examples, an analysis summary can provide information about relevance among communications between users (e.g., communications between employees of a company or organization). For example, when a user composes a new communication, such as an email (e.g., one of the email messages 128 shown in FIG. 1), content of the new communication can be used to identify and make the user aware of other information (such as archived communications stored by the data storage facility 102) that relates to the content of the new communication. For example, a search engine resident on the data storage facility 102 can use content of a new email in formulating an implicit search key to find other related archived emails stored by the data storage facility 102. The other related archived emails can be presented to a user by way of an analysis summary in a business intelligence report 300, and the user may find that the pertinent archived communications contain information useful to the user even though the user might not have otherwise known they existed and were available to him. More information about determining relevance among communications can be found in U.S. patent application Ser. No. 13/044,842, titled "Enhancing Communication," which is hereby incorporated by reference in its entirety.

FIG. 4 shows a flowchart of an example process 400 that a data storage facility 102 (FIG. 1) can use to receive data from a client entity (402), provide access to the data (404, 406), and provide an analysis to the client entity (408).

At stage 402, the data storage facility 102 receives data from a client entity (e.g., client entity 108 shown in FIG. 1). The data is received on an ongoing basis because the data storage facility 102 serves as the primary data storage mechanism for the client entity. At any time that the data storage facility 102 stores received data, the data storage facility 102 provides access to the data by way of an interface 204 (FIG. 2). The data storage facility 102 provides this access at stage 404. Data can be received at stage 402 at any time on an ongoing basis.

Once the data storage facility 102 has received data from the client entity, at stage 406, the data storage facility 102 provides access to the data to business intelligence applications (e.g., business intelligence applications 114 shown in FIG. 1). The data storage facility 102 can provide access to the data by way of an interface 202 (FIG. 2). The business intelligence applications 114 perform analyses of the data at times chosen by the business intelligence applications 114. At stage 408, the business intelligence applications 114 provide results of the analysis to the client entity from which the data originated. For example, the results can be provided in the form of electronic messages (e.g., business intelligence reports 300 shown in FIG. 3). The results can be provided at any time on an ongoing basis. Stages 406 and 408 can occur in parallel with stages 402 and 404.

FIG. 5 is a block diagram of an example computer system 500 that forms one of the systems of the network that is engaged in completing a task. For example, referring to FIG. 1, the data storage facility 102 or a server forming a portion of the data storage facility 102 could be an example of the system 500 described here. The system 500 includes a processor 510, a memory 520, a storage device 530, and an input/output device 540. Each of the components 510, 520, 530, and 540 can be interconnected, for example, using a system bus 550. The processor 510 is capable of processing instructions for execution within the system 500. In some implementations, the processor 510 is a single-threaded processor. In some implementations, the processor 510 is a multi-threaded processor. In some implementations, the processor 510 is a quantum computer. The processor 510 is capable of processing instructions stored in the memory 520 or on the storage device 530. The processor 510 may execute applications such as the business intelligence applications 114 shown in FIG. 1 or the business intelligence application 206 shown in FIG. 2.

The memory 520 stores information within the system 500. In some implementations, the memory 520 is a computer-readable medium. In some implementations, the memory 520 is a volatile memory unit. In some implementations, the memory 520 is a non-volatile memory unit.

The storage device 530 is capable of providing mass storage for the system 500. In some implementations, the storage device 530 is a computer-readable medium. In various different implementations, the storage device 530 can include, for example, a hard disk device, an optical disk device, a solid-date drive, a flash drive, magnetic tape, or some other large capacity storage device. For example, the storage device may store long-term data, such as the data 106 stored on behalf of the client entity 108 as shown in FIG. 1. The input/output device 540 provides input/output operations for the system 500. In some implementations, the input/output device 540 can include one or more of a network interface devices, e.g., an Ethernet card, a serial communication device, e.g., an RS-232 port, and/or a wireless interface device, e.g., an 802.11 card, a 3G wireless modem, a 4G wireless modem, or a carrier pigeon interface. A network interface device allows the system 500 to communicate, for example, transmit and receive data such as data 106 as shown in FIG. 1. In some implementations, the input/output device can include driver devices configured to receive input data and send output data to other input/output devices, e.g., keyboard, printer and display devices 560. In some implementations, mobile computing devices, mobile communication devices, and other devices can be used.

A server (e.g., a server forming a portion of the data storage facility 102 shown in FIG. 1) can be realized by instructions that upon execution cause one or more processing devices to carry out the processes and functions described above, for example, sending and receiving data and compiling business intelligence reports 300 (FIG. 3). Such instructions can comprise, for example, interpreted instructions such as script instructions, or executable code, or other instructions stored in a computer readable medium. A data storage facility 102 can be distributively implemented over a network, such as a server farm, or a set of widely distributed servers or can be implemented in a single virtual device that includes multiple distributed devices that operate in coordination with one another. For example, one of the devices can control the other devices, or the devices may operate under a set of coordinated rules or protocols, or the devices may be coordinated in another fashion. The coordinated operation of the multiple distributed devices presents the appearance of operating as a single device.

Although an example processing system has been described in FIG. 5, implementations of the subject matter and the functional operations described above can be implemented in other types of digital electronic circuitry, or in computer software, firmware, or hardware, including the structures disclosed in this specification and their structural equivalents, or in combinations of one or more of them. Implementations of the subject matter described in this specification, such as software for analyzing data to determine business intelligence (e.g. business intelligence applications 114 shown in FIG. 1), can be implemented as one or more computer program products, i.e., one or more modules of computer program instructions encoded on a tangible program carrier, for example a computer-readable medium, for execution by, or to control the operation of, a processing system. The computer readable medium can be a machine readable storage device, a machine readable storage substrate, a memory device, a composition of matter effecting a machine readable propagated signal, or a combination of one or more of them.

The term "system" may encompass all apparatus, devices, and machines for processing data, including by way of example a programmable processor, a computer, or multiple processors or computers. A processing system can include, in addition to hardware, code that creates an execution environment for the computer program in question, e.g., code that constitutes processor firmware, a protocol stack, a database management system, an operating system, or a combination of one or more of them.

A business intelligence application 114 or other applications 121, 122 (FIG. 1) could be examples of computer programs executing on a system. A computer program (also known as a program, software, software application, script, executable logic, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Computer readable media suitable for storing computer program instructions and data include all forms of non-volatile or volatile memory, media and memory devices, including by way of example semiconductor memory devices, e.g., EPROM, EEPROM, and flash memory devices; magnetic disks, e.g., internal hard disks or removable disks or magnetic tapes; magneto optical disks; and CD-ROM and DVD-ROM disks. The processor and the memory can be supplemented by, or incorporated in, special purpose logic circuitry. Sometimes a server (e.g, forming a portion of a data storage facility 102) is a general purpose computer, and sometimes it is a custom-tailored special purpose electronic device, and sometimes it is a combination of these things. Implementations can include a back end component, e.g., a data server, or a middleware component, e.g., an application server, or a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

Certain features that are described that are described above in the context of separate implementations can also be implemented in combination in a single implementation. Conversely, features that are described in the context of a single implementation can be implemented in multiple implementations separately or in any sub-combinations.

The order in which operations are performed as described above can be altered. In certain circumstances, multitasking and parallel processing may be advantageous. The separation of system components in the implementations described above should not be understood as requiring such separation.

Other implementations are within the scope of the following claims.

The invention claimed is:

1. An apparatus comprising:
a data storage system associated with a provider entity and storing data on behalf of a client entity, the data being accessible from the data storage system by the client entity;
a data interface enabling access by the provider entity to the data of the data storage system; and
an analysis engine comprising a processor and memory maintained by the provider entity to, at discrete intervals determined by the analysis engine:
access the data using the data interface,
identify, among the data, electronic communications at least some of which each include data identifying a sender or a receiver, the sender or receiver being an individual associated with the client entity,
analyze the data, including:
identifying one or more words or phrases that occur in one or more of the electronic communications and meet a threshold frequency of occurrence, and
comparing the identified words or phrases to one or more words or phrases occurring in electronic communications analyzed by the analysis engine at multiple previous discrete intervals, and
at times determined based on the results of the analysis and the user's preferences for receiving information, generate results of the analysis to the client entity, the results indicating a characteristic of at least one of the individuals associated with the client entity, the characteristic being related to at least one of the identified words or phrases.

2. The apparatus of claim 1 comprising a client interface to enable the access to the data of the data storage system by the client entity.

3. The apparatus of claim 1 comprising a client interface to receive updates of the data from the client entity.

4. The apparatus of claim 1 in which the analysis is performed based on preferences of the client entity.

5. The apparatus of claim 1 in which the analysis is performed on a subset of the data that is associated with a specified period of time.

6. The apparatus of claim 1 in which the analysis comprises an identification of patterns in the data.

7. The apparatus of claim 1 in which the data received from the client entity comprises electronic messages.

8. The apparatus of claim 1 in which the results are provided to the client entity in electronic messages.

9. The apparatus of claim 1 in which the results are provided to the client entity at times based on characteristics of the results.

10. The apparatus of claim 9 in which the characteristics of the results comprise an event identified by the analysis engine as a priority event.

11. The apparatus of claim 1 in which the data storage system stores data received from a second client entity.

12. The apparatus of claim 11 in which the data received from the client entity is not accessible to the second client entity.

13. The apparatus of claim 11 in which the analysis engine generates the results partially based on an analysis of the data received from the second client entity.

14. The apparatus of claim 1 in which the provider entity is independent of the client entity.

15. The apparatus of claim 1 in which the client entity comprises a commercial enterprise.

16. The apparatus of claim 1 in which the results are generated based on two instances of data analysis each performed at two different times.

17. The apparatus of claim 1 in which the data is accessible from the data storage system by the client entity on a network shared with entities other than the client entity and the provider entity.

18. The apparatus of claim 1 comprising:
a client interface enabling access to the data of the data storage system by the client entity, the results of the analysis being determined based on preferences of the client entity and provided to the client entity by the client interface at times determined by the analysis engine based on characteristics of the analysis.

19. The apparatus of claim 1, the data being accessible from the data storage system by the provider entity at times determined by the provider entity for the provider entity to perform continuous analysis of the data with permission of the client entity.

20. The apparatus of claim 1, comprising:
a software interface maintained by a provider entity and providing access to the provider entity to data stored by a data storage system on behalf of a client entity,
wherein the extent of the access is tailored to applications that access and analyze the data at times determined by the provider entity.

21. The apparatus of claim 1 in which the discrete intervals each correspond to one or more measures of time.

22. The apparatus of claim 1 in which the threshold frequency of occurrence is determined based on previous occurrences of the words or phrases.

23. The apparatus of claim 1 comprising a processor and memory.

24. A method comprising:
at a provider entity:
storing data on a data storage system on behalf of a client entity, the data being accessible from the data storage system by the client entity;
identifying, among the data, electronic communications at least some of which each include data identifying a sender or a receiver, the sender or receiver being an individual associated with the client entity;
analyzing the data at discrete intervals, including:
identifying one or more words or phrases that occur in one or more of the electronic communications and meet a threshold frequency of occurrence, and
comparing the identified words or phrases to one or more words or phrases occurring in electronic communications analyzed at multiple previous discrete intervals; and
at times determined by the provider, generating results of the analysis for use by the client entity at times determined based on the results of the analysis and the user's preferences for receiving information, the results indicating a characteristic of at least one of the individuals associated with the client entity, the characteristic being related to at least one of the identified words or phrases.

25. The method of claim 24 in which the analysis is performed based on preferences of the client entity.

26. The method of claim 24 in which the analysis comprises an identification of patterns in the data.

27. The method of claim 24 in which the results are provided to the client entity at times based on characteristics of the results.

28. The method of claim 24 in which the results generated based on two instances of data analysis each performed at two different times.

29. The method of claim 24 in which the data is accessible from the data storage system by the client entity on a network shared with entities other than the client entity and the provider entity.

30. The method of claim 24 comprising:
receiving, from the client entity, data of distinct data systems associated with the client entity;
processing the data from the distinct data systems for storage on the data storage system; and
enabling access by the client entity to the processed data and by an analysis engine associated with the data storage system.

31. The method of claim 30 in which the data of at least one of the distinct data systems is formatted in a data format proprietary to the respective distinct data system.

32. The method of claim 30 in which the data of one of the data systems is formatted in a first data format and the data of another of the data systems is formatted in a second data format.

33. The method of claim 30 in which the access by the client entity to the processed data is enabled by a single interface to the data.

34. The method of claim 30 in which the data storage system comprises a plurality of coordinated physical computer systems.

35. The method of claim 24 comprising:
receiving, from the client entity, data of a plurality of data systems;
processing the data for use by applications executing on the data storage system and for analysis by an analysis mechanism associated with the data storage system; and
enabling access by the client entity to the applications.

36. The method of claim 35 in which at least one of the applications stores data in a first data format and data of at least one of the data systems is formatted in a second data format.

37. The method of claim 35 in which the single data storage system comprises a plurality of coordinated physical computer systems.

38. The method of claim 24 comprising:
receiving, from the client entity, data of distinct data systems associated with the client entity;
processing the data from the distinct data systems for storage on the data storage system and for use by applications executing on the data storage system; and
enabling access by the client entity to the processed data and the applications, and
enabling access by an analysis engine associated with the data storage system to the processed data.

39. The method of claim 38 in which the access to at least some of the processed data is provided using at least one of the applications.

40. The method of claim 38 in which the single data storage system comprises a plurality of coordinated physical computer systems.

41. The method of claim 24 comprising:
performing the ongoing analysis of the data based on preferences of the client entity, the data being accessed at a plurality of times determined by the provider entity; and
delivering the results to the client entity at times based on characteristics of the results.

42. A computer-readable storage device having instructions stored thereon that, when executed by the computer system, instruct the computer system to carry out operations including:
storing data, on behalf of a client entity, on a data storage system associated with a provider entity, the data being accessible from the data storage system by the client entity; and
identifying, among the data, electronic communications at least some of which each include data identifying a sender or a receiver, the sender or receiver being an individual associated with the client entity;
analyzing the data at discrete intervals, including:
identifying one or more words or phrases that occur in one or more of the electronic communications and meet a threshold frequency of occurrence, and
comparing the identified words or phrases to one or more words or phrases occurring in electronic communications analyzed at multiple previous discrete intervals; and
at times determined by the provider and generate results of the analysis for use by the client entity at times determined based on the results of the analysis and the user's preferences for receiving information, the results indicating a characteristic of at least one of the individuals associated with the client entity, the characteristic being related to at least one of the identified words or phrases.

* * * * *

UNITED STATES PATENT AND TRADEMARK OFFICE
CERTIFICATE OF CORRECTION

PATENT NO.         : 9,009,220 B2
APPLICATION NO.    : 13/273696
DATED              : April 14, 2015
INVENTOR(S)        : Nathaniel S. Borenstein It is certified that error appears in the above-identified patent and that said Letters Patent is hereby corrected as shown below:

Title Page, Column 2, Line 5, "Other Publications", delete "Busines s_Intelligenc.pdf>")." insert --Business_Intelligence.pdf>).--

Page 2, Column 2, Line 17, delete "Norwell:" insert --Norwel:--

Page 2, Column 2, Line 27, delete "http://www.norwel.co.uk/news/Proactive-Reporting.html," insert --http://www.realtalkuk.com/reporting.html--

Page 2, Column 2, Line 44, delete "Intelligenc.pdf>," insert --Intelligence.pdf>,--

Signed and Sealed this
Eleventh Day of August, 2015

Michelle K. Lee
*Director of the United States Patent and Trademark Office*